UNITED STATES PATENT OFFICE.

FRITZ LINDE, OF DORTMUND, GERMANY.

PROCESS OF REFINING OILS.

SPECIFICATION forming part of Letters Patent No. 692,157, dated January 28, 1902.

Application filed November 19, 1900. Serial No. 36,982. (No specimens.)

*To all whom it may concern:*

Be it known that I, FRITZ LINDE, a subject of the German Emperor, and a resident of the city of Dortmund, Germany, have invented certain new and useful Improvements in Processes of Purifying Rape-Seed Oil and other Sweet Oils, of which the following is a full, clear, and exact specification.

The purifying of rape-seed oil and similar sweet oils has been hitherto carried out in households by heating the oil in a pan before use to the necessary temperature. A very disagreeable and unwholesome thick smoke is thus produced, and the person who does the purifying is also exposed to danger, inasmuch as he is liable to receive burns by the flame beating over into the pan or by the splashing over of scalding oil. The said disadvantages are attributable to the fact that it was hitherto impossible to purify rape-seed and similar oils in large quantities and to produce them in such a state that they were directly available for baking and roasting purposes, as the temperature (about 280° centigrade) necessary for the purifying of the oil did not allow of this. At such a degree of heat the rape-seed oil rises in the cooking vessel, so that a purifying in this way is practically impossible.

The object of the present invention is to render it possible to purify rape-seed oil and similar sweet oils in factories and to improve the taste and smell of the said oil or oils.

The process is as follows: Ten to fifteen per cent., by volume, of rich unboiled milk is added to the rape-seed oil, and this mixture is beaten or stirred until the oil has been uniformly mixed with the milk. This mixture is then poured into an open steam boiling apparatus, which is heated by means of a superheater and which should be about two to three times as large as the quantity of oil it is to contain. The mixture is gradually brought to a temperature of 100° centigrade, at which temperature the water contained in the milk evaporates. A white layer is thereby formed on the surface of the mass, which prevents the rising and boiling over of the liquid even at a greater degree of heat. As soon as the water has evaporated the mixture ceases boiling. In the boiling process described above the fatty substances contained in the milk are combined with the oil, giving the latter an excellent taste and agreeable smell. The temperature is then increased until the white layer on the oil becomes brown. The oil gives off a very agreeable smell, which is similar to that produced by the baking of cakes. The steam is subsequently turned off and the oil filtered. The oil thus purified and favorably influenced by the fatty substances of the milk is now ready for use. It does not foam and smell as raw rape-seed oil does when used for baking and roasting purposes, but the character of the oil as regards smell and taste is quite different.

The residues of the oil which result from the filtration can be used as fodder.

Of course milk preparations or the active substances contained in milk can be added to the rape-seed oil in a different form instead of milk in the present invention. The addition of cream is particularly recommended, as the oil hereby obtains the taste of butter. It will therefore be understood that cream or those substances contained in the milk which bring about the useful result hereinbefore referred to as well as any mixtures or compounds containing these active substances are to be considered equivalents of the milk specifically named in the claim, and I desire it to be understood that the claim is to be interpreted accordingly.

What I claim, and desire to secure by Letters Patent, is—

The process of treating rape-seed oil and other sweet oils, which consists in the following steps: first, adding ten to fifteen per cent. of rich milk to the oil; second, heating the mixture and continuing the application of heat until a thick covering or layer is formed thereon; and third, removing such layer or covering; the latter preventing splashing out or foaming of the oil while boiling, and the oil being purified and its taste and smell being improved, substantially as described.

Dated this 1st day of November, 1900.

FRITZ LINDE.

Witnesses:
OTTO KÖNIG,
J. A. RITTERSHAUS.